United States Patent
Jackson

[11] 3,912,795
[45] Oct. 14, 1975

[54] HUMIDIFYING GAS

[76] Inventor: Richard R. Jackson, Eight Trinity Road, Marblehead, Mass. 01947

[22] Filed: Dec. 3, 1973

[21] Appl. No.: 421,021

Related U.S. Application Data

[63] Continuation-in-part of Ser. No. 301,773, Oct. 30, 1972, Pat. No. 3,871,373.

[52] U.S. Cl................. 261/36 R; 128/186; 261/104
[51] Int. Cl............................................ A61m 15/00
[58] Field of Search ........ 261/104, 95, 99; 261/141, 261/142, 36 R; 128/186–188, 192

[56] References Cited
UNITED STATES PATENTS

| | | | |
|---|---|---|---|
| 2,650,709 | 9/1953 | Rosenak et al. ..................... | 210/321 |
| 2,675,349 | 4/1954 | Saroff et al. .......................... | 210/321 |
| 3,442,389 | 5/1969 | Mendelson........................... | 210/321 |
| 3,505,175 | 4/1970 | Zalles................................... | 261/99 X |
| 3,616,796 | 11/1971 | Jackson ............................ | 261/153 X |
| 3,713,440 | 1/1973 | Nicholes ............................. | 128/188 |

*Primary Examiner*—Frank W. Lutter
*Assistant Examiner*—William Cuchlinski, Jr.

[57] ABSTRACT

Apparatus for humidifying a gas and delivering it to be breathed, comprising a gas chamber having an inlet for communication with a source of the gas, and an outlet, a water chamber coextensive over a zone with a portion of the gas chamber, one of the chambers having a wall permeable to water vapor at the zone, and means for bringing water into intimate contact with one side of the wall at the zone at a vapor pressure sufficient to cause passage of water vapor through the wall and into the gas chamber to humidify gas therein, the means comprising water return and supply tubes effectively sealed to the water chamber and arranged for respective connection to a source of vacuum and a water reservoir exposed to atmospheric pressure.

11 Claims, 3 Drawing Figures

HUMIDIFYING GAS

CROSS-REFERENCE TO RELATED APPLICATION

This application is a continuation-in-part of copending application Serial No. 301,773, filed Oct. 30, 1972, now patent No. 3,871,373, the disclosure of which to the extent not set forth here, is hereby incorporated by reference.

BACKGROUND OF THE INVENTION

This invention relates to humidifying and delivering gases such as air or oxygen to a patient. Some aspects of the invention are disclosed and claimed in my U.S. Pat. No. 3,616,796 (Nov. 2, 1971), the disclosure of which is hereby incorporated by reference.

SUMMARY OF THE INVENTION

The invention provides compact, simple, reliable, easily manufactured, inexpensive, light weight humidification apparatus useful in a variety of applications (e.g., with a wall oxygen outlet, a respirator, anesthesia apparatus, portable breathing aids such as used in connection with laryngectomy or tracheostomy); minimizes condensation of water in the gas tube (thus improving operation and reducing the need to empty condensed water reservoirs); makes possible humidification without a large air chamber; and provides for uniform, effective introduction of water vapor into the gas stream, without surges, and without danger of drowning the patient. The apparatus is easily handled, is comfortable to the patient in use, and need not be interrupted in operation for refilling or the like. In particular, the total volume of water flowing through the system is reduced, for a given degree of humidification, and water delivery is such that, should a rupture occur in the delivery tube, the amount of water entering the air stream will be minimized. The humidification system of the invention is easily added to existing breathing apparatus.

In general, the invention features a gas chamber having an inlet for communication with a source of the gas, and an outlet, a water chamber coextensive over a zone with a portion of the gas chamber, one of the chambers having a wall permeable to water vapor at the zone, and means for bringing water into intimate contact with one side of the wall at the zone at a vapor pressure sufficient to cause passage of water vapor through the wall and into the gas chamber to humidify gas therein, the means comprising water return and supply tubes effectively sealed to the water chamber and arranged for respective connection to a source of vacuum and a water reservoir exposed to atmospheric pressure. In some preferred embodiments the water chamber is elongated, closed at one end, sealed to the water return and supply tubes at the other end, and extends within the gas chamber, said water supply tube extending within the water chamber to adjacent its closed end; and a porous filler (e.g., metal mesh or stiff, open-celled foam) is arranged within the water chamber to preserve a water flow volume therein despite the compressive force of the atmosphere during operation. In other preferred embodiments the water chamber and the filler therein are spirally wound, with additional porous filler being wound external to and between the spiral turns of the water chamber, and the gas chamber is a housing containing the spirally wound assembly and having gas inlet and outlet openings in communication with the additional filler; the gas inlet and outlet openings are in opposite walls of the housing to provide for flow of gas along the axis of the spiral; the water supply and return tubes respectively enter opposite ends of the water chamber; and the filler is expanded polypropylene.

Other advantages and features of the invention will be apparent from the description of preferred embodiments thereof and from the drawings.

DESCRIPTION OF PREFERRED EMBODIMENTS

Figure 1:
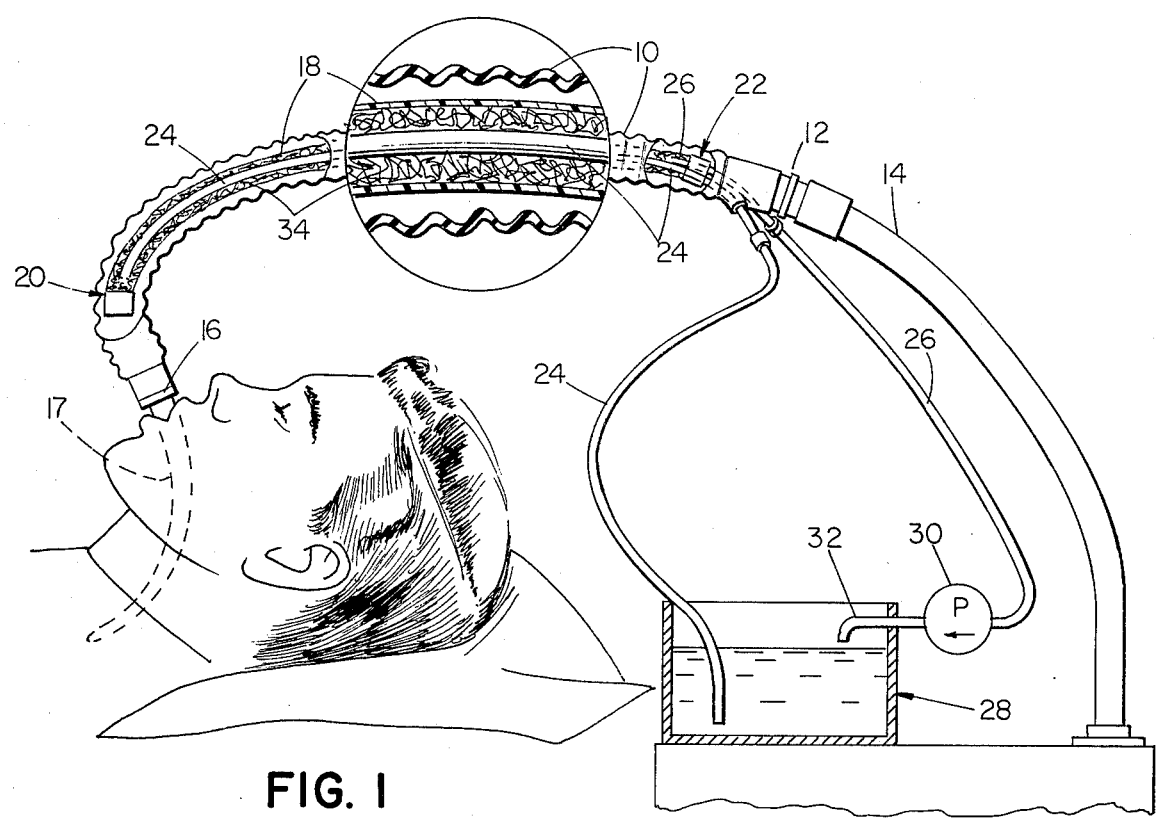
FIG. 1 is a somewhat diagrammatic side view, partially broken away, of a respirator system.

FIG. 1 shows a respirator in which air is supplied orally to the patient through a corrugated delivery tube 10 having an inlet end 12 connected to a conventional air supply conduit 14, and an outlet end 16 connected to endotracheal tube 17. Water chamber 18 extends internally along the length of tube 10, is closed at end 20, and is sealed at end 22 around water delivery conduit 24 and water return conduit 26. Conduit 24 extends from adjacent end 20 of chamber 18 through the wall of tube 10 and is connected to temperature controlled water reservoir 28. Conduit 26 extends from the mouth of chamber 18 at end 22, through the wall of tube 10 and is connected to the inlet of suction pump 30, the outlet of which is connected by return conduit 32 to spill into reservoir 28. Metal mesh 34, or other porous filler material, fills the space between conduit 24 and the inner surface of chamber 18, so that when pump 30 is operating water will be sucked from reservoir 28 to end 20 of chamber 18, will flow back along the length of the chamber and will exit through return conduit 26, thereby providing flow of water along the inner surface of chamber 18.

Tube 18 is constructed of a material permeable to water vapor but impermeable to liquid water within the intended operating range of vapor and water pressures. Preferred materials are water vapor permeable polypropylene (e.g., hydrophobic expanded polypropylene sold by Celanese Corporation) and cellophane.

In operation, with air flowing through tube 10, and with water at preferably 100°F flowing through chamber 18, the water vapor pressure will be sufficient to cause vapor to pass through the wall of the water chamber to humidify the air. The water temperature will affect the vapor pressure and hence establishes the degree of humidification as well as warming the air. The suction feed of the water through chamber 18 insures that, in the unlikely event of a rupture in the chamber wall, flow of water from the reservoir will stop automatically, thus minimizing the entry of water into the air circuit. The internal location of the water chamber allows the use of conventional air delivery tubes; serves, with the volume-reducing filler in that chamber, to minimize the volume of water flowing through the water chamber for a given degree of humidification; and keeps the system light weight and flexible for easy handling and patient comfort. The mechanical independence of the air tube and water chamber over most of their lengths contributes to flexibility.

Figure 3:
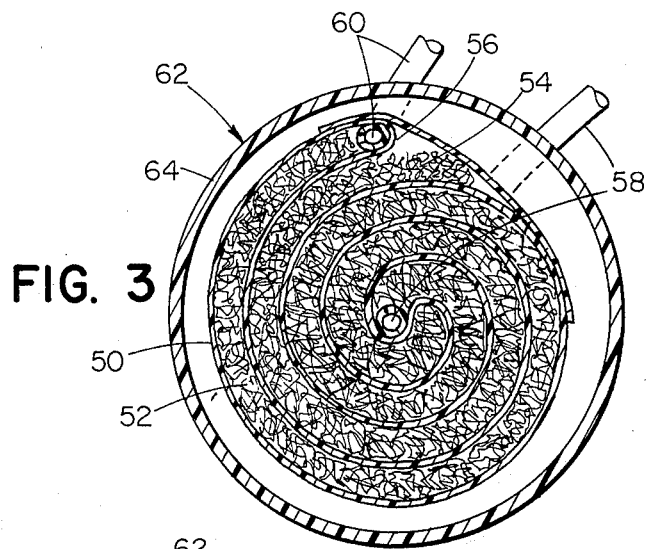
FIG. 3 is a sectional view taken along 3—3 of FIG. 2.
Figure 2:
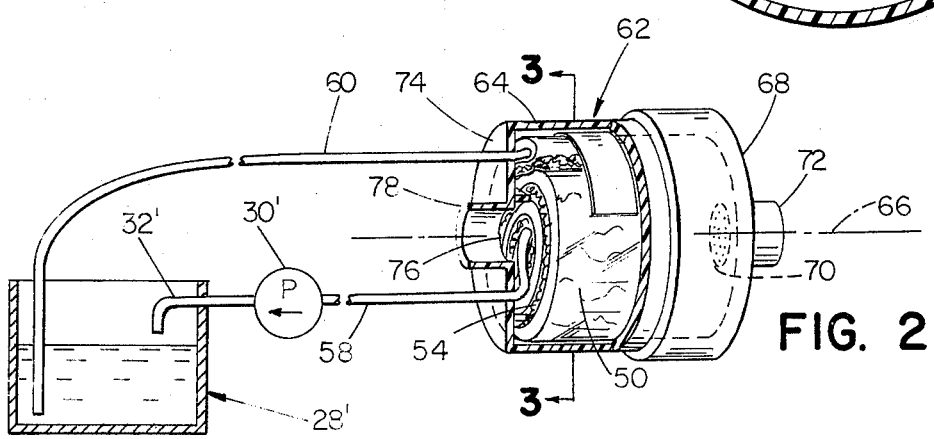
FIG. 2 is a side view, partially broken away, of another embodiment.

In the embodiment of FIGS. 2 and 3 water chamber 50 consists of an elongated semi-permeable tube (of the same material as chamber 18 of FIG. 1) would in a spiral. An elongated strip 52 of stiff open-celled plastic foam is located inside chamber 50, and a similar strip 54 is arranged outside of chamber 50, between its turns. These elements are assembled by first inserting strip 52 inside the semi-permeable tube, laying strip 54 on top of the tube, and spirally winding the three elements together. The outer end 56 of the spiral is adhesively secured to the previous turn. Water return and supply conduits 58, 60 are connected at opposite ends of chamber 50 and extend respectively to suction pump 30' and reservoir 28'. The spiral assembly is contained in housing 62 having a perimeter wall 64 parallel to axis 66 of the spiral turns, end wall 68 with an opening 70 and a connector 72 for an endotracheal tube, and a second end wall 74 with an opening 76 and a connector 78 for an air delivery tube.

In operation, pump 30' draws water from reservoir 28' through the foam 52 in chamber 50, humidifying the air passing along axis 66 through foam 54. The structure is extremely light weight and compact, even compared with that of FIG. 1, and otherwise has the operational advantages and features described in connection with the FIG. 1 embodiment.

In using either of the embodiments shown, reservoir 28, 28' should be kept below the level of the rest of the humidifier apparatus, so that should a leak occur substantially all the water in the system will run back into the reservoir, and the patient circuit will not be flooded.

Other embodiments are within the following claims.

What is claimed is:

1. Apparatus for humidifying a gas and delivering it to be breathed, comprising
   a gas chamber having an inlet for communication with a source of said gas, and an outlet,
   a water chamber coextensive over a zone with a portion of said gas chamber,
   one of said chambers having a wall permeable to water vapor at said zone,
   means for bringing water into intimate contact with one side of said wall at said zone at a vapor pressure sufficient to cause passage of water vapor through said wall and into said gas chamber to humidify gas therein, said means comprising water return and supply tubes effectively sealed to said water chamber and arranged for respective connection to a source of vacuum and a water reservoir exposed to atmospheric pressure, and
   a porous filler within said water chamber to preserve a water flow volume therein despite the compressive force of the atmosphere during operation.

2. The apparatus as claimed in claim 1 whereby said water chamber extends within said gas chamber and includes said wall.

3. The apparatus as claimed in claim 2 whereby said water chamber is elongated, is closed at one end, and is sealed to said tubes at the other end, said supply tube extending within said water chamber to adjacent said closed end.

4. The apparatus as claimed in claim 1 wherein said tubes are respectively connected to said source and said reservoir.

5. The apparatus as claimed in claim 1 wherein said filler is metal mesh.

6. The apparatus as claimed in claim 1 wherein said filler is stiff, open-celled foam.

7. The apparatus as claimed in claim 1 wherein said water chamber with said filler therein is folded on itself into a compact assembly, with additional porous filler being arranged external to and between the folds of said water chamber, and said gas chamber is a housing containing said assembly and having gas inlet and outlet openings in communication with said additional filler.

8. The apparatus as claimed in claim 7 wherein said filler is expanded polypropylene.

9. The apparatus as claimed in claim 8 wherein said assembly is spirally round.

10. The apparatus as claimed in claim 9 wherein said gas inlet and outlet openings are in opposite walls of said housing to provide for flow of gas along the axis of the spiral.

11. The apparatus as claimed in claim 9 wherein said water supply and return tubes respectively enter opposite ends of said water chamber.

* * * * *

UNITED STATES PATENT OFFICE
CERTIFICATE OF CORRECTION

Patent No. 3,912,795          Dated October 14, 1975

Inventor(s) Richard R. Jackson

It is certified that error appears in the above-identified patent and that said Letters Patent are hereby corrected as shown below:

The term of this patent subsequent to

November 2, 1988, has been disclaimed.

*Signed and Sealed this*

*twenty-second* Day of *June 1976*

[SEAL]

*Attest:*

RUTH C. MASON
*Attesting Officer*

C. MARSHALL DANN
*Commissioner of Patents and Trademarks*